United States Patent
Hollas

(10) Patent No.: US 11,201,001 B2
(45) Date of Patent: Dec. 14, 2021

(54) ISOLATED ELECTRICALLY CONDUCTIVE ELEMENT AND METHOD FOR MANUFACTURING THE SAME

(71) Applicant: HEW-KABEL GMBH, Wipperfürth (DE)

(72) Inventor: Ingo Hollas, Geldern (DE)

(73) Assignee: HEW-KABEL GMBH, Wipperfürth (DE)

(*) Notice: Subject to any disclaimer, the term of this patent is extended or adjusted under 35 U.S.C. 154(b) by 0 days.

(21) Appl. No.: 17/112,013

(22) Filed: Dec. 4, 2020

(65) Prior Publication Data
US 2021/0183536 A1    Jun. 17, 2021

(30) Foreign Application Priority Data
Dec. 11, 2019   (DE) .......................... 202019005067.1

(51) Int. Cl.
| | | |
|---|---|---|
| *H01B 7/02* | (2006.01) | |
| *H01B 1/02* | (2006.01) | |
| *H01B 3/44* | (2006.01) | |
| *H01B 13/14* | (2006.01) | |

(52) U.S. Cl.
CPC .............. *H01B 7/0275* (2013.01); *H01B 1/02* (2013.01); *H01B 3/441* (2013.01); *H01B 13/14* (2013.01)

(58) Field of Classification Search
CPC ........ H01B 7/0275; H01B 1/02; H01B 3/441; H01B 13/14; H01B 7/02
USPC ....................................... 174/110 R–110 PM
See application file for complete search history.

(56) References Cited

U.S. PATENT DOCUMENTS

| | | | | |
|---|---|---|---|---|
| 2010/0034504 A1* | 2/2010 | Aten | ....................... | B32B 15/08 385/123 |
| 2013/0037304 A1* | 2/2013 | Ikeda | ....................... | H01B 3/30 174/119 C |
| 2019/0131037 A1 | 5/2019 | Hochstöger et al. | | |

FOREIGN PATENT DOCUMENTS

EP   3226258 A1   10/2017

* cited by examiner

*Primary Examiner* — William H. Mayo, III
(74) *Attorney, Agent, or Firm* — Hudak, Shunk & Farine Co. LPA

(57) ABSTRACT

An insulated electrically conductive element, including at least one inner electrically conductive element and at least one outer insulating element, and to a method for producing such an insulated electrically conductive element.

19 Claims, 1 Drawing Sheet

ISOLATED ELECTRICALLY CONDUCTIVE ELEMENT AND METHOD FOR MANUFACTURING THE SAME

FIELD OF THE INVENTION

The invention relates to an insulated electrically conductive element, comprising at least one inner electrically conductive element and at least one outer insulating element, and to a method for producing such an insulated electrically conductive element.

BACKGROUND OF THE INVENTION

Insulated electrically conductive elements of such a type are known in the state of the art, in particular in the form of electrical conductors or cables provided with external insulating sheathing. In numerous applications of such insulated electrical conductors it is desired to be able to lift the outer insulating element away from the inner electrically conductive element—that is to say, to strip the insulation from a cable. In these applications it is consequently desired to provide a slight adhesion of the outer insulating element on the inner electrically conductive element, in order to be able to connect the inner electrically conductive element to, for example, an energy-source or another electrically conductive element or a component to be supplied with data or current.

In other applications, however, it may be desired to provide as great as possible an adhesion of the outer insulating element on the inner electrically conductive element. In cases where an outer insulating element consisting of a synthetic material is provided, in principle there is the problem that the adhesion on an inner electrically conductive element consisting of metal will more likely be slight, by reason of the surface properties of the inner electrically conductive element which, for instance, consists of copper. EP 3 226 258 A1, for instance, is concerned with these difficulties. This printed publication pertaining to the state of the art proposes as a solution to provide an electrical conductor consisting of copper or of an alloy having a high copper content or aluminum or other electrically conductive materials, and also a coating consisting of thermoplastic synthetic material, the electrical conductor under a protective-gas atmosphere being bombarded with ions of the protective gas in a gas plasma, in order to remove an oxide layer that has been formed on the surface of the conductor, and/or to increase the surface energy of the conductor. Subsequently the coating is applied onto the surface of the conductor, at least some of the coating being applied onto the conductor under protective-gas atmosphere.

However, it has become evident that neither a corona pretreatment nor a plasma pretreatment nor an etching of the surface of the electrically conductive element has had the result that the outer insulating element adheres on the inner electrically conductive element so firmly that a detachment is not possible or is substantially no longer possible.

SUMMARY OF THE INVENTION

The object underlying the invention is therefore to provide an insulated electrically conductive element comprising at least one inner electrically conductive element and at least one outer insulating element, in which a stripping—that is to say, removal—of the outer insulating element from the inner conductive element is not possible or at least substantially not possible.

For an insulated electrically conductive element comprising at least one inner electrically conductive element and at least one outer insulating element, the object is achieved in that the at least one outer insulating element has been firmly bonded with the at least one inner electrically conductive element, at least one primer having been provided for the purpose of generating a firm bond between the at least one inner electrically conductive element and the at least one outer insulating element. For a method for producing an insulated electrically conductive element, the object is achieved in that at least one primer is applied by extrusion onto the surface of at least one inner electrically conductive element, and at least one outer insulating element is applied by extrusion onto the at least one primer. Further developments of the invention are defined in the dependent claims.

By this means, an insulated electrically conductive element is created, in which the stripping—that is to say, removal—of the at least one outer insulating element from the at least one inner electrically conductive element is reliably prevented by the interposition of the at least one primer. The primer has been formed in such a way that, on the one hand, it has been firmly bonded with the surface of the at least one inner electrically conductive element and, on the other hand, it also enters into a firm bond with the at least one outer insulating element. Advantageously, the at least one primer has been firmly bonded with the surface of the at least one inner electrically conductive element by reason of chemical bonding. This means that the primer forms a chemical compound with at least one constituent part that has been provided in the region of the surface of the at least one inner electrically conductive element. The primer serves as adhesion-promoter; it comprises bifunctional molecules that are able to bond inorganic substances with organic substances. The mode of action of the primer is based on the increase in the wettability of the substrate surfaces and also on the possibility of entering into chemical or physical linkages.

The at least one inner electrically conductive element may consist, for instance at least in the region of its surface, of at least one metal or at least one metal alloy or at least one material having a hydroxyl group or an anhydride group. The primer forms a chemical compound with the hydroxyl group or anhydride group—that is to say, it reacts with one of these groups or with these groups. As a result of such a chemical compound being formed, a firm bond is consequently created between the primer and the surface of the at least one inner electrically conductive element. Accordingly, the at least one inner electrically conductive element may contain, at least in the region of its surface, one or more of the materials carbon, carbon fiber(s), metal such as copper, silver, gold, nickel, tin, or one or more metal alloys that form(s) a compound with functional groups contained in the primer. Primers may be polyolefinic primers or adhesion-promoters, silane mediators and other organometallic primers or adhesion-promoters. In the case of a polyolefinic primer, for instance, polymers are modified by various functional groups. At least one of the functional groups contains oxygen atoms. By virtue of the high electronegativity of the oxygen atoms in the functional group, negative partial charges arise which are able to interact with hydrogen atoms having a strongly positive partial charge. This dipole/dipole interaction, or hydrogen bonding, forms the strongest interaction in the case of the weak bonds. Since hydrogen atoms are located on all the metal surfaces, the dipole/dipole interaction results in an outstanding wetting and adhesion on the surface of the at least one inner electrically conductive element.

The at least one primer has been or is advantageously bonded with the at least one outer insulating element by material closure. The at least one outer insulating element advantageously consists of at least one synthetic material. For instance, the at least one outer insulating element may consist of at least one fluoropolymer such as, for example, PFA (polytetrafluoroethylene-perfluoro(alkoxy vinyl ether)), PTFE (polytetrafluoroethylene), FEP (fluorinated ethylene propylene), ETFE (ethylene tetrafluoroethylene), or of one or more further/other fluoropolymers, in particular of modified PFA. By virtue of the primer, acetate groups (esters of acetic acid) are introduced into the polymer chain of the at least one fluoropolymer of the at least one outer insulating element, such as PFA (polytetrafluoroethylene-perfluoro (alkoxy vinyl ether)), during polymerization. As already mentioned, by virtue of the high electronegativity of the oxygen atoms in the functional group, negative partial charges arise which are able to interact with hydrogen atoms having a strongly positive partial charge. By virtue of the hydrogen atoms located on the surface of the at least one inner electrically conductive element, the dipole/dipole interaction already mentioned results in an outstanding wetting and adhesion of the at least one outer insulating element on the surface of the at least one inner electrically conductive element. Of course, the at least one outer insulating element may also consist of another polymer material. This material can be selected individually, depending on the respective application. The at least one outer insulating element may also be of multilayer design and may consist of more than one synthetic material. The at least one primer may consist of a functionalized fluoropolymer.

The primer material is advantageously applied by extrusion onto the surface, or outside, of the at least one inner electrically conductive element. Likewise, the at least one outer insulating element can be applied onto the primer by extrusion. For instance, application may be undertaken by co-extrusion. In this case, use may be made of, for instance, a so-called skin sheath or a sleeve, in order to be able to apply the at least two materials—on the one hand, the at least one primer, and on the other hand the at least one outer insulating element—one above the other on the inner electrically conductive element without difficulty and in the desired thickness. For instance, the outer diameter of the inner electrically conductive element provided with the at least one primer can be checked continuously or at intervals, in order to monitor the layer thickness of the primer prior to the application of the at least one outer insulating element, and to be able to adjust said layer thickness in optimal and continuously invariable manner.

The insulated electrically conductive element that has been formed may be, for instance, an electrical conductor insulated externally by the at least one insulating element, in particular an externally insulated rectangular conductor or round conductor. Other cross-sectional shapes of such an externally insulated conductor are also possible. The respective layer thickness of the at least one primer and of the at least one outer insulating element which surrounds the electrical conductor—that is to say, the inner electrically conductive element—can be adjusted individually in application-specific manner. Such an adjustment may, for example, be undertaken via a skin sheath or sleeve already mentioned.

BRIEF DESCRIPTION OF THE DRAWINGS

For more detailed elucidation of the invention, an exemplary embodiment of the latter will be described in greater detail in the following with reference to the drawings. These drawings show in.

DETAILED DESCRIPTION OF THE INVENTION

Figure 1:
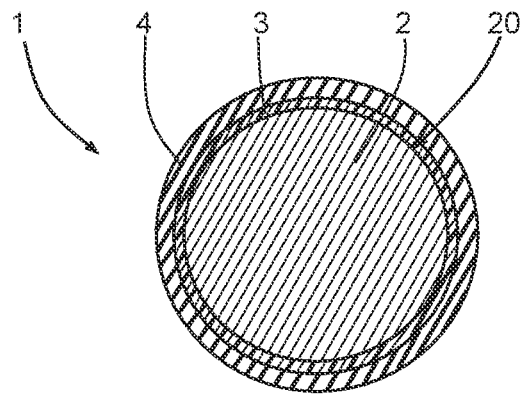
FIG. 1 a cross-sectional view through an insulated electrically conductive element according to the invention in the form of an externally insulated round conductor and FIG. 2 a cross-sectional view through a second embodiment of an electrically conductive element according to the invention in the form of an externally insulated rectangular conductor.

A cross-sectional view of an insulated electrically conductive element in the form of an externally insulated electrical conductor 1—here, in the form of a round conductor—is shown in FIG. 1. The externally insulated electrical conductor 1 exhibits an inner electrically conductive element 2, above that a primer 3, and above that an outer insulating element 4. The inner electrically conductive element 2 has been firmly bonded with the primer 3 via a chemical bond, and said primer has been bonded with the outer insulating element 4 by material closure. The inner electrically conductive element 2 exhibits, at least in the region of its surface 20, a metal such as copper, silver, gold, nickel, tin or another metal, carbon or a at least one metal alloy or carbon fibers, with which the primer 3 reacts chemically. For instance, the inner electrically conductive element 2 may be a bare copper conductor or may exhibit at least one copper alloy at least in the region of its surface 20. In particular, the primer reacts with a hydroxyl (OH) group or with an anhydride group that is located at least in the region of the surface 20 of the inner electrically conductive element 2 or that is a constituent part of the material of the inner electrically conductive element 2, or the inner electrically conductive element 2 consists of such a material. The primer 3 is, for instance, a functionalized fluoropolymer that is able to form a chemical compound with the above materials. Such a functionalized fluoropolymer exhibits for this purpose at least one functional group that forms a chemical compound with the above materials.

The outer insulating element 4 may, for instance, likewise consist of at least one polymer, in particular PFA or modified PFA. A primer 3 consisting of a functionalized fluoropolymer is able to enter into a good and tight materially closed bond with PFA.

Figure 2:
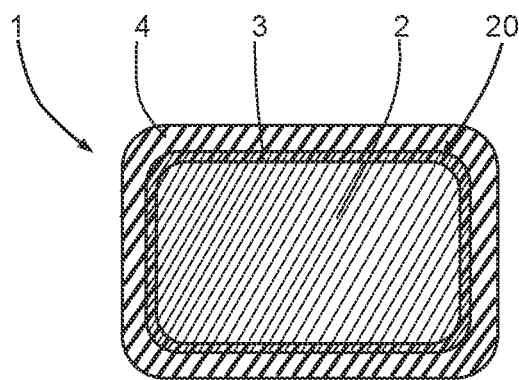

The externally insulated electrical conductor 1 according to FIG. 1 takes the form of a round conductor and accordingly exhibits a round cross-section. Besides this practical variant of the shaping, numerous further variants may be provided, one practical variant in the form of a rectangular conductor being shown in FIG. 2. This rectangular conductor likewise exhibits the inner electrically conductive element 2, which is an electrical conductor, surrounded by the primer 3, and the latter, in turn, encased by the outer insulating element 4. Other cross-sectional shapes, on the one hand of the inner electrically conductive element 2 and, on the other hand, of the layers of the primer 3 and of the outer insulating element 4 surrounding said element, are also possible.

In particular, the primer 3 and the outer insulating element 4 are applied by extrusion, in particular co-extrusion, on the surface 20 or the outside of the inner electrically conductive element 2, in particular the electrical conductor. In this case, a skin sheath or sleeve can be provided for the purpose of adjusting a specifiable layer thickness of the materials of the primer and of the outer insulating element one above the other on the surface of the inner electrically conductive element. The outer diameter of the inner electrically conductive element provided with the primer can be checked continuously or at intervals for the purpose of monitoring and/or adjusting the layer thickness of the primer prior to the application of the outer insulating element.

Besides the practical variants, described in the foregoing and shown in the figures, of an insulated electrically conductive element that exhibits at least one inner electrically conductive element and at least one outer insulating element, numerous further variants may be formed, in particular also arbitrary combinations of the aforementioned features, the at least one outer insulating element having been firmly bonded with the at least one inner electrically conductive element, and consequently a stripping—that is to say, loosening—of the outer insulating element from the inner electrically conductive element or electrical conductor not being possible, or at least not without destroying the surface of the inner electrically conductive element. For the purpose of generating such a firm bond between the at least one inner electrically conductive element and the at least one outer insulating element, at least one primer is or has been provided which has been or is firmly bonded both with the outer insulating element and with the inner electrically conductive element.

LIST OF REFERENCE SYMBOLS 1 externally insulated electrical conductor
2 inner electrically conductive element
3 primer
4 outer insulating element
20 surface

What is claimed is:

1. An insulated electrically conductive element, comprising:
    at least one inner electrically conductive element and at least one outer insulating element,
    wherein the at least one outer insulating element has been firmly bonded with the at least one inner electrically conductive element, at least one primer having been provided for the purpose of generating a firm bond between the at least one inner electrically conductive element and the at least one outer insulating element, wherein the at least one primer consists of a functionalized fluoropolymer.

2. The insulated electrically conductive element as claimed in claim 1, wherein the at least one primer has been firmly bonded with the surface of the at least one inner electrically conductive element by reason of chemical bonding.

3. The insulated electrically conductive element as claimed in claim 2, wherein the at least one primer has been firmly bonded with the at least one outer insulating element by material closure, and wherein the at least one inner electrically conductive element consists, at least in the region of its surface, of at least one metal or at least one metal alloy or at least one material having a hydroxyl group r anhydride group.

4. The insulated electrically conductive element as claimed in claim 3, wherein the at least one inner electrically conductive element contains, at least in the region of its surface, one or more of metal, carbon or carbon fibers or one or more metal alloys, and wherein the at least one outer insulating element consists of at least one synthetic material.

5. The insulated electrically conductive element as claimed in claim 4, wherein the at least one outer insulating element consists of at least one fluoropolymer, and wherein the at least one primer consists of a functionalized fluoropolymer.

6. The insulated electrically conductive element as claimed in claim 5, wherein the insulated electrically conductive element is an electrical conductor insulated externally by the at least one insulating element, and wherein the insulated electrically conductive element is a rectangular conductor or round conductor insulated externally by the at least one insulating element.

7. The insulated electrically conductive element as claimed in claim 1, wherein the at least one primer has been firmly bonded with the at least one outer insulating element by material closure.

8. The insulated electrically conductive element as claimed in claim 1, wherein the at least one inner electrically conductive element consists, at least in the region of its surface, of at least one metal or at least one metal alloy or at least one material having a hydroxyl group or anhydride group.

9. The insulated electrically conductive element as claimed in claim 8, wherein the at least one inner electrically conductive element contains, at least in the region of its surface, one or more of metal, carbon or carbon fibers or one or more metal alloys.

10. The insulated electrically conductive element as claimed in claim 9, wherein the metal is copper, silver, gold, nickel, or tin.

11. The insulated electrically conductive element as claimed in claim 1, wherein the at least one outer insulating element consists of at least one synthetic material.

12. The insulated electrically conductive element as claimed in claim 11, wherein the at least one outer insulating element consists of at least one fluoropolymer.

13. The insulated electrically conductive element as claimed in claim 12, wherein the fluoropolymer is polytetrafluoroethylene-perfluoro(alkoxy vinyl ether) (PFA), polytetrafluoroethylene (PTFE), fluorinated ethylene propylene (FEP), ethylene tetrafluoroethylene (ETFE), or modified PFA.

14. The insulated electrically conductive element as claimed in claim 1, wherein the insulated electrically conductive element is an electrical conductor insulated externally by the at least one insulating element.

15. The insulated electrically conductive element as claimed in claim 1, wherein the insulated electrically conductive element is a rectangular conductor or round conductor insulated externally by the at least one insulating element.

16. A method for producing the insulated electrically conductive element as claimed in claim 1, wherein the at least one primer is applied by extrusion onto the surface of the at least one inner electrically conductive element, and the at least one outer insulating element is applied by extrusion onto the at least one primer.

17. The method as claimed in claim 16, wherein the at least one primer and the at least one outer insulating element are applied by co-extrusion onto the surface of the at least one inner electrically conductive element, a skin sheath or sleeve having been provided for the purpose of adjusting a specifiable layer thickness of the at least two materials one above the other on the surface of the at least one inner electrically conductive element.

18. The method as claimed in claim 17, wherein the outer diameter of the at least one inner electrically conductive element provided with the at least one primer is checked continuously or at intervals for the purpose of monitoring and/or adjusting the layer thickness of the primer prior to the application of the at least one outer insulating element.

19. The method as claimed in claim 16, wherein the outer diameter of the at least one inner electrically conductive element provided with the at least one primer is checked continuously or at intervals for the purpose of monitoring and/or adjusting the layer thickness of the primer prior to the application of the at least one outer insulating element.

* * * * *